Oct. 3, 1939.  J. C. SORENSON ET AL  2,175,135
HOOK RETRIEVER
Filed May 23, 1936
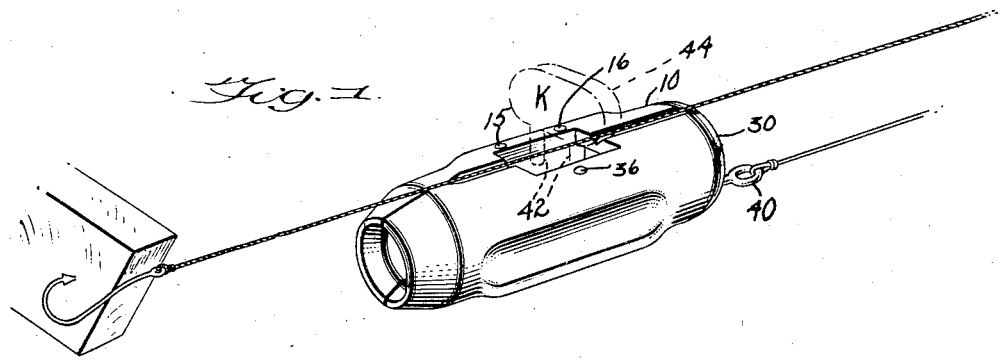
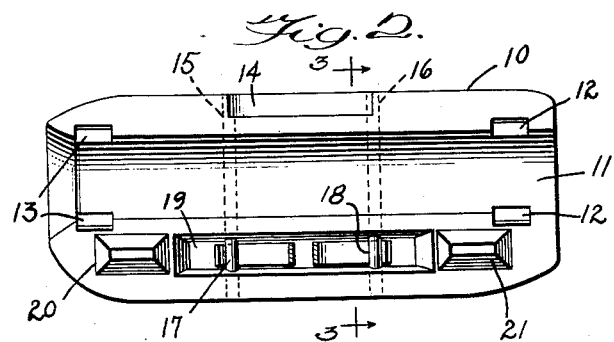
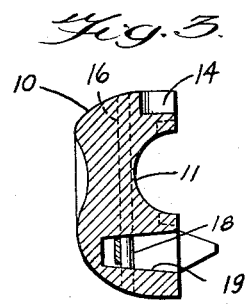
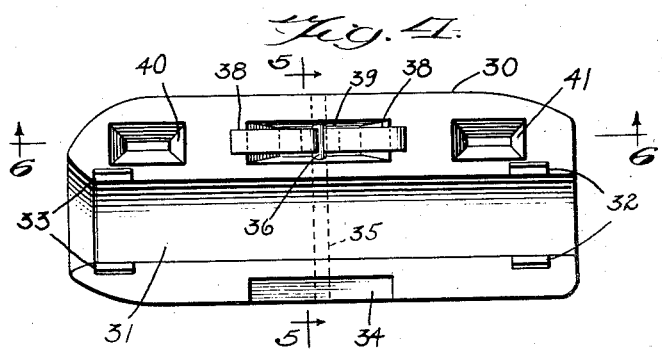
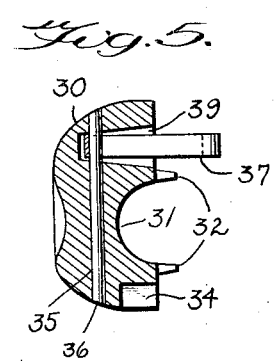
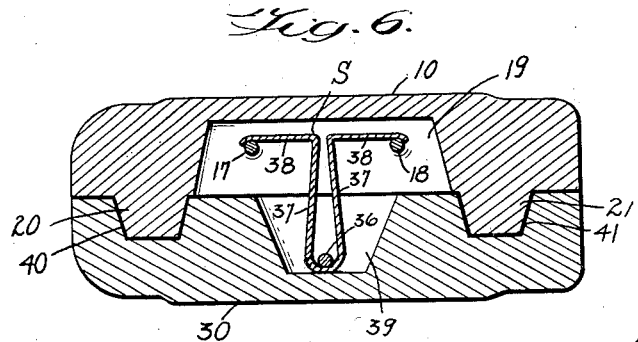
JOHN SORENSON AND
HENRY C. HANSEN
Inventors Patented Oct. 3, 1939

2,175,135

UNITED STATES PATENT OFFICE 2,175,135

HOOK RETRIEVER

John C. Sorenson and Henry C. Hansen, Rhinelander, Wis.

Application May 23, 1936, Serial No. 81,517

5 Claims. (Cl. 43—30)

Our invention relates to a fishing accessory and more particularly to a device for releasing a hook or an artificial bait when the same has been caught or "snagged" on an obstruction below the surface of the water.

An object of our invention is to provide an improved device for releasing fish-hooks or artificial baits when the same have been caught on some obstruction below the surface of the water.

A further object is to provide a device of this character which includes novel means of applying it to a fishing line.

A further object is to provide such a device which is composed of at least two substantially complementary parts and novel means for connecting said parts.

Other objects and advantages reside in the particular structure of our invention, combination and arrangement of the several parts, and in the particular mode of operation, all of which will be readily apparent to those skilled in the art upon reference to the detailed description to follow in connection with the drawing forming a part of this specification.

In the drawing:

Figure 1 is a perspective view showing our improved device during the act of applying it to a fishing line;

Figure 2 is an inside elevation of one section of the device;

Figure 3 is a cross-sectional view taken substantially on the line 3—3 of Figure 2;

Figure 4 is an inside elevation of the other section of our invention;

Figure 5 is a cross-sectional view taken substantially on the line 5—5 of Figure 4, and Figure 6 is a longitudinal sectional view through the two sections of the device when the same are connected together and taken on a plane corresponding substantially to that of the line 6—6 of Figure 4.

Referring more particularly to the drawing, in which like reference characters have been used throughout to designate like parts, 10 indicates one of the sections of the device. The other section of the device is indicated by 30 and it will be seen from Figure 1 that the two sections together form a roughly cylindrical body having a cylindrical but offset central bore therethrough. By referring to Figures 2 and 3, it will be seen that the base of the member 10 which abuts the complementary base of the member 30 is provided with a substantially semi-cylindrical groove 11 arranged longitudinally thereof but offset with respect to the axis. The side edges of said groove 11 adjacent the ends thereof are provided with pairs of suitable recesses 13 and 12. The outer edge of one of the flat surfaces is provided with a recess 19 located centrally thereof. A pair of suitable lugs 20 and 21 are provided adjacent either end of the recess 19. It will be noted further that the section 10 is bored transversely as at 15 and 16 to receive pins 17 and 18, the purpose of which will be described later. Attention is directed to the fact that Figure 3 clearly shows that while the pins 17 and 18 pass through the recess 19, which is of considerable depth, they do not pass through the recess 14 nor the semi-cylindrical groove 11.

The section 30 is substantially complementary to the section 10, being provided with a similarly arranged longitudinal groove 31, lugs 33 and 32 to seat in the recesses 13 and 12, and recesses 40 and 41 receive the lugs 20 and 21. It is also provided with a recess 34 which, together with the recess 14 of section 10, form a rectangular recess on the peripheral surface of the device when the two members are arranged as in Figure 1. The section 30 is provided also at a point on its wider flat surface with a recess 39 which opposes the larger recess 19 of section 10 when the two sections are brought together. Section 30 is also bored transversely as at 35 to receive a pin 36. It will be noted that Figure 5 shows that the pin 36 intersects the recess 39 adjacent the base thereof.

While we have shown and described what is now believed to be the preferred arrangement of lugs, recesses, etc., it is to be understood that some or all of these members may be eliminated and that any analogous complementary means may be substituted to accomplish the same purpose. In fact, no interfitting lugs and recesses may be necessary at all although we have found in practice that a better structure results if something akin to the arrangement we have shown is used.

The two sections 10 and 30 are connected together by means of a substantially U-shaped spring member S. Said spring member comprises a pair of legs 37 the upper ends of which are bent or flared outwardly at substantially right angles to the legs to provide portions 38. As will be seen from Figure 6, the base of the spring S is held in the recess 39 by means of the pin 36. The legs 37 extend into the recess 19 of the section 10 and the ends of the portions 38 are resiliently fitted behind the pins 17 and 18 of this section. The extreme ends of the portions 38 may be hooked slightly as shown to insure their being retained behind the pins 17 and 18. Of course, the particular spring shown and described may be altered to suit, or other spring means substituted without departure from the spirit of our invention.

In assembling the device the spring S is seated in the bottom of the recess 39 and the pin 36 is extended through the bore 35 and riveted or otherwise secured in place. The section 10 is then fitted over the section 30 and the pins 17 and 18 inserted and secured. It is our intention to provide a spring S of sufficient strength to resiliently hold the two sections 10 and 30 together against accidental spreading apart.

In operation, when the fisherman's line becomes "snagged" the fishing line is laid longitudinally across the rectanguar recess formed by the abutment of the recesses 14 and 34. The fisherman then takes the key K which comprises a finger portion 44 and a pair of spaced legs 42 and places it over the line in the rectangular recess with the legs 42 straddling the line. The key is then turned to a position at right angles to the axis of the device which forces the legs 42 of the key against the bottom of the recesses 14 and 34 and causes the two sections 10 and 30 to be spread apart slightly at their upper abutting edges, the spring S being sufficiently resilient to permit this. The crack resulting from the slight spreading of the two sections is sufficiently large to permit the fishing line to be dropped into the bore of the device. The key is then removed and the two sections spring together to retain the line loosely in said bore. One of the sections may be provided with an eye 40 or other suitable means to which an auxiliary line is attached. The device is then permitted to slide down the fishing line to disengage the hook or other artificial bait from the snag. It may be pointed out in this connection that the two sections 10 and 30 are formed of metal, preferably, and have considerable weight. Thus, when the device reaches the snagged hook, the operator can "joggle" the device up and down by means of the auxiliary line to dislodge the hook from the snag. If this is not sufficient to dislodge the hook a pull may be exerted on the fishing line which will result in a lever action on the hook to dislodge it.

While we have shown a key for spreading the free edges of the sections 10 and 30 apart, it is obvious that this is not necessary if the fisherman has sufficient strength to open the device without it or if the spring be made weaker. Also, key arrangements other than that shown and described are considered to be within the scope of the invention.

While we have shown and described what is now believed to be the preferred form of our invention, it is not our intention to limit ourselves to the precise arrangement and structure shown but only to devices conforming to our invention as hereinafter claimed.

We claim:

1. A device of the class described comprising a substantially cylindrical body formed of a pair of substantially semi-cylindrical sections, spring means comprising a substantially U-shaped member having a base and upstanding legs, means connecting the base of said member to one semi-cylindrical section, and means carried by said other semi-cylindrical section and engageable with the free ends of the legs of said U-shaped spring member for resiliently connecting said sections together.

2. A device of the class described comprising a substantially cyindrical body formed of a pair of substantially semi-cylindrical sections, spring means comprising a substantially U-shaped member having a base and upstanding legs, the free ends of said legs being flared outwardly at substantially right angles, a pin insertible transversely of one of said semi-cylindrical sections and engaging the base of said spring to connect the same thereto, and pins insertible transversely of said other semi-cylindrical section and engageabe with the flared portion of said spring legs for resiliently connecting said sections together.

3. A device for dislodging snagged hooks of fishing lines comprising an elongated body member, said member being divided longitudinally to form a pair of complementary separable sections, each of said sections being formed to provide a longitudinally extending groove therein, said grooves cooperating to provide a fishing line receiving bore for said body when said sections are joined together, said bore having a diameter substantially larger than that of the largest fishing line used with the device to permit said body member to be freely slidable upon the line, said bore being offset with respect to the axis of said body member, spring means normally maintaining said sections in abutting relationship, and portions of said sections being formed to provide means for spreading said sections slightly apart to permit the insertion of the fishing line into said bore.

4. A device for dislodging snagged hooks of fishing lines comprising an elongated body member, said member being divided longitudinally to form a pair of complementary and separable sections, each of said sections being formed to provide a longitudinally extending groove therein, said grooves cooperating to provide a fishing line receiving bore for said body when said sections are joined together, said bore having a diameter substantially larger than that of the largest fishing line used with the device to permit said body member to be freely slidable upon the line, means connecting said sections together and including a spring, said spring being wholly at one side of said bore and normally maintaining said sections in abutting relationship.

5. A device for dislodging snagged hooks of fishing lines comprising an elongated body member, said member being divided longitudinally to form a pair of complementary and separable sections, each of said sections being formed to provide a longitudinally extending groove therein, said grooves cooperating to provide a fishing line receiving bore for said body when said sections are joined together, said bore having a diameter substantially larger than that of the largest fishing line used with the device to permit said body member to be freely slidable upon the line, and a spring connection located at one side of said bore for connecting said sections together and maintaining the same in abutting relationship.

JOHN C. SORENSON.
HENRY C. HANSEN.